United States Patent [19]
Craig et al.

[11] Patent Number: 5,963,311
[45] Date of Patent: Oct. 5, 1999

[54] SURFACE AND PARTICLE IMAGING PYROMETER AND METHOD OF USE

[75] Inventors: James E. Craig, Lake Forest, Calif.; Ronald A. Parker, Genesseo, N.Y.; David Y. Lee, West Covina; Ernesto Hurtado, Laguna Niguel, both of Calif.

[73] Assignee: Stratonics, Inc., Laguna Hills, Calif.

[21] Appl. No.: 08/928,240

[22] Filed: Sep. 12, 1997

Related U.S. Application Data

[51] Int. Cl.[6] .................................. G01J 5/48; G01J 5/60
[52] U.S. Cl. ......................................... 356/43; 356/45
[58] Field of Search ........................................ 356/43–45

[56] References Cited

U.S. PATENT DOCUMENTS

| | | | |
|---|---|---|---|
| 4,411,519 | 10/1983 | Tagami | 356/45 |
| 4,413,324 | 11/1983 | Tatsuwaki et al. | 356/45 |
| 4,656,331 | 4/1987 | Lillquist et al. | 219/121.47 |
| 4,687,344 | 8/1987 | Lillquist | 374/124 |
| 5,180,921 | 1/1993 | Moreau et al. | 250/554 |
| 5,225,883 | 7/1993 | Carter et al. | 356/45 |
| 5,337,081 | 8/1994 | Kamiya et al. | 348/61 |

OTHER PUBLICATIONS

Gharib et al., Particle Tracing Revisited, 1989, pp. 110–126.

*Primary Examiner*—Robert H. Kim
*Assistant Examiner*—Amanda Merlino
*Attorney, Agent, or Firm*—Gene Scott-Patent Law & Venture Group

[57] ABSTRACT

An optical pyrometer and method of use provides a dual path optical system for processing light from a radiating stationary object or a moving thermal stream. Light is collected by primary optics forming an intermediate image in a plane of a field limiting aperture for establishing a preferred field of view. The light is then split into a pair of complimentary beams with one beam directed through a long wavelength filter and the other directed through a short wavelength filter. Both beams then move through separate secondary optics and are then rejoined and directed as normal non-overlapping and adjacent images onto a digitizing detector for capturing the images. Signals from the detector are handled by a computer where a ratio mapping of pair of signals from corresponding points on the two images is constructed and displayed on a monitor for viewing a temperature map of the object or thermal stream. The temperature of particles in the thermal stream is determined in a similar manner as well as particle velocity and size.

5 Claims, 4 Drawing Sheets

SURFACE AND PARTICLE IMAGING PYROMETER AND METHOD OF USE

BACKGROUND OF THE INVENTION

1. Field of the Invention

This invention relates generally to pyrometers and more particularly to a pyrometer system using a dual optical path method for comparing long and short wavelengths of light emitted by a radiating object or moving stream of particles and a sensor used to image two images side-by-side.

2. Description of Related Art

The following art defines the present state of this field:

Tagami, U.S. Pat. No. 4,411,519 describes methods and systems for measuring the temperature and spectral factors of a number of specimens (or radiators). The radiant fluxes from the specimens are spectrally analyzed with respect to effective wavelengths from M different channels (M being greater than or equal to 3). A relation among the spectral radiant flux intensity, approximated spectral factor (depending only on wavelength) and the temperature is determined for each channel by using Planck's radiation law with the condition that a relation N+K=M is kept among M of the number of channels, N of the number of specimens with unknown temperature values and K of the number of unknown terms of the approximated spectral factors of the specimens. Strict algebraic development of such relation is employed to cancel out all of the unknown terms of the spectral factor to obtain a one-dimensional equation concerning the sole temperature. Such equation is solved to determined the temperature of the specimens, and the spectral factor of the specimens, and the spectral factor of the specimens is obtained from the determined temperature values.

Tatsuwaki et al., U. S. Pat. No. 4,413,324 describes a temperature pattern distribution measuring method and apparatus by which portions of light from parts of an area of an object whose temperature distribution patterns is to be measured, and whose parts are in a predetermined pattern, are passed through first and second optical filters which respectively pass different wavelengths of light. The level of energy passed by the respective filters for the respective portions of light are determined by scanning the light from the filters with a pickup device or devices and, by using the determined energy levels. An arithmetic unit carries out a two-color temperature determining operation for determining the temperature on each part of the area of the object. The temperature pattern of the area of the object can thereby be determined from the temperatures of the parts of the area.

Lillquist et al., U.S. Pat. No. 4,656,331 describes a multi-purpose optical sensor that operates in the medium-to-far infrared wavelength spectral region to sense the surface temperature of plasma-jet spray coating material. This plasma itself emits little or no radiation in this region and, accordingly, the output signal from the sensor is used to adjust the electrical input and other variables associated with the plasma spray torch to insure that particles arriving at the substrate surface to be coated are, in fact, in a molten state. The sensor employs infrared filters and, additionally, the sensor is used to monitor not only coating and temperature but also plasma beam divergence and particle seeding density to provide other control functions.

Lillquist, U.S. Pat. No. 4,687,344 describes an imaging radiometer for high temperature measurements that has a sensor head comprised of a solid-state video camera operated in a fixed gain mode, preferably one with a charge injection device detector, an infrared filter, and a lens system to image a radiating object on the detector array. Spectral response of the system is limited to 700 to 1100 nanometers or a smaller portion of this near-infrared band. The video signal output of the sensor is processed and object temperature is displayed on a television monitor, alternatively the video signal is presented to a digital frame grabber and converted to a temperature map.

Moreau et al., U.S. Pat. No. 5,180,921 describes a method and an apparatus for monitoring simultaneously the temperature and the velocity of sprayed particles. The system is comprised of a sensor head attached to the spray gun, and optical fiber transmitting the collected radiation to detection apparatus, and a protective detection cabinet incorporating two detectors. A two-slit or multiple-slit, mask is located in the sensor head at the end of the optical fiber. For the temperature measurements, the emitted radiation is collected by the sensor head, transmitted to two photodetectors, and filtered by interference filters at two adjacent wavelengths. The particle temperature may be computed from the ratio of the detector outputs. To measure the velocity, the two-slit system collects radiation emitted by the in-flight particles travelling in the sensor's field of view, which generates a double peak light pulse transmitted through the optical fiber. The time delay between these two peaks may be evaluated automatically and the particle velocity computed knowing the distance between the two slit images.

Carter et al., U.S. Pat. No. 5,225,883 describes an apparatus and method for providing a real-time video display and a temperature map display of an object, in particular a flame, comprises a single CCD video camera and optical equipment which focuses separate light bundles onto a photosensitive surface of the camera. A separate band pass filter is used in each light bundle to filter selected different wavelengths of light. The video signal from the camera is used in a video digitizer to obtain data, which can be used to calculate a temperature map based on the different wavelengths of light of the two bundles. The video signal is also used to produce a real-time video display of the object.

Kamiya et al., U.S. Pat. No. 5,337,081 describes a triple view imaging apparatus that is provided for measuring quantitative distribution of material or property in a sample. In the triple view imaging apparatus, an optical system receives an original optical image of the sample, separates the original optical image into at least two secondary optical images having different optical properties from one another, and projects the at least two secondary optical images at a single view angle. A single video camera simultaneously picks up the thus projected plurality of secondary optical images as a single composite image and produces image signals representing the light intensities of the plurality of secondary optical images. An image processor receives the image signals and processes the image signals to obtain final image signals representing a relationship between the image signals for respective ones of the plurality of secondary optical images. An image display receives the calculated final image signals and displays a tertiary optical image based on the calculated final image signals, which defines quantitative distribution of material or property in the sample.

The prior art apparatus and methods suffer from important limitations. We find no provision or method step for matching the magnifications of the two images to the necessary level of precision for achieving the required accuracy of the method. The prior art does not teach how to control stray light at the detection plane. Stray light can be a major cause of error in the detection system. The prior art also fails to teach a means for presenting two images normally onto the detector surface so as to avoid distortion and foreshortening. If the images are not in focus across the entire detector field, both the accuracy and resolution of the temperature distribution will be degraded. Adjustment of angular and linear registration of dual images to the precision required to achieve high-resolution temperature readings is not taught. In the prior art, data processing steps are vague and do not include calibration. The prior art tends to teach the use of the Planck relationships directly, while in reality losses due to transmission efficiencies in each leg of a dual path system, and differences in sensitivity at the detector are significant and must be taken into account in any successful dual image process. The method of Moreau tends to be slow and have reliability problems, both of which are avoided in the present method. While the two-wavelength imaging pyrometers taught in the prior art use two synchronized imaging cameras, the current invention achieves similar optical performance but with the reduced size and cost and the simplicity of a single camera configuration. The present invention overcomes the limitations of the prior art by providing a beam joiner for improved dual image positioning correlation and normal beam ray directing and provides further related advantages as described in the following summary.

SUMMARY OF THE INVENTION

Visible and infrared sensitive imaging cameras have been used to visualize hot objects, and further to use the brightness of the objects to measure temperature distribution. However, the latter is difficult in that brightness is a function of both temperature and emissivity. Thus, even an isothermal object will have brightness variations because of surface roughness and conformation variations. Two objects at the same temperature radiate at different brightness levels, depending on their emissivities. A rough object is generally brighter then a smooth one. Generally, the instant invention teaches a solution based upon a novel combination of optical systems and imaging detectors to achieve high resolution temperature distribution measurement. Optical pyrometry is a measurement technique in which the temperature of an object is determined based upon the magnitude of the thermal radiation emitted by the object. The energy is measured at one or two wavelengths and then related to the Planck radiation function. Lillquist, above, teaches taking measurements at a series of points to resolve the temperature distribution on an object. This approach is limited in its dependence on the measurement of absolute brightness. Errors are related to signal attenuation due to the optical path, and emissivity differences between a calibration standard and a subject.

The present invention takes advantage of forming two images of the subject at two different wavelengths so that the images may be compared, pixel by pixel in a one-to-one mapping in order to find the brightness ratio of the images at each point (pixel). The temperature at each point is a unique function of the brightness ratio at that point and is unaffected by the absolute value of the subject's emittance. The present invention teaches certain benefits in construction and use which give rise to the objectives described below.

In a preferred embodiment of the present invention, a multi-purpose apparatus provides an accurate, high-resolution, two-dimensional, real-time, video display and a temperature map of a hot object. It comprises a single charge coupled device (CCD) video camera, optical components for splitting long and short wavelength representations of the image, and a data processor and monitor.

The optical system includes a primary lens which forms a focused image of the object onto a field stop, followed by a beam-splitter which directs the incident radiation along two optical paths through a secondary optical system to a CCD detector. Separate band pass filters are used in each path to filter and pass different wavelengths of the radiation. The optical elements in each path of the secondary optical system relays the image formed in the plane of the field stop to the detector. A second beam-splitter, used as a beam combiner, or, in this case, a beam joiner, is positioned directly in front of the detector, and is used to orient the two optical paths with respect to the detector so that the images are in focus across the entire field of view. Thus long and short wavelength images are formed on adjacent regions of the detector. These images resolve the brightness of the object in the respective long and short pass bands.

A digital processor and frame grabber are used to digitize and store the images at a selected frame rate. The frame grabber may be one such is commercially available from Data Translation, Inc., Boston, Mass., as model 3154 and is well known in the art. The ratio between the brightness in the long and short wavelength images is used to compute a temperature map of the object. The images and the temperature map are displayed on the video monitor.

In another embodiment, the apparatus is used to measure the temperature, velocity and size of particles in a thermal spray. The detector here is an intensified CCD camera. When the particles in a thermal spray are viewed with an intensified CCD camera with a fast gate time, bright particle images are exposed as streaks. The streak lengths are used to measure the velocity. Further, the particle temperature is measured at discrete points along the streak, by measuring the brightness ratio from the long and short wavelength imagery. The particle size is measured by two methods depending on the size of the particle image in pixels. For large resolved particles, the dimension of the streak width is measured directly. For smaller particles, the absolute brightness is used to determine the particle size. The method of streak identification is fully disclosed by: M.Gharib and C. Willert, "Particle Tracing: Revisited" lecture notes in Engineering, Advances in Fluid Mechanics Measurements, ed. M. Gad-El-Hak, Springer, v. 45, pp. 110–126, 1969 hereby incorporated into this application by reference.

The primary object of the invention is to provide a high-resolution image of an emissive object, by providing an improved optical design in a dual bandpass imaging pyrometer which is in focus across a selected field of view.

Another object of the present invention is to provide a system for providing a high-resolution, two-dimensional temperature map of an emissive object.

A still further object of the present invention is to provide a sensor to monitor the temperature, velocity and size of particles in a thermal spray.

An important further object of the present invention is to provide means for more accurately controlling the temperature of particles in a plasma spray jet so as to assure that the particles are in a molten state.

Other features and advantages of the present invention will become apparent from the following more detailed description, taken in conjunction with the accompanying drawings, which illustrate, by way of example, the principles of the invention.

BRIEF DESCRIPTION OF THE DRAWING

The file of this patent contains at least one drawing executed in color: Copies of this patent with color drawings (s) will be provided by the Patent and Trademark Office upon request and payment of the necessary fee.

The accompanying drawings illustrate the present invention. In such drawings.

DETAILED DESCRIPTION OF THE INVENTION

Figure 1:
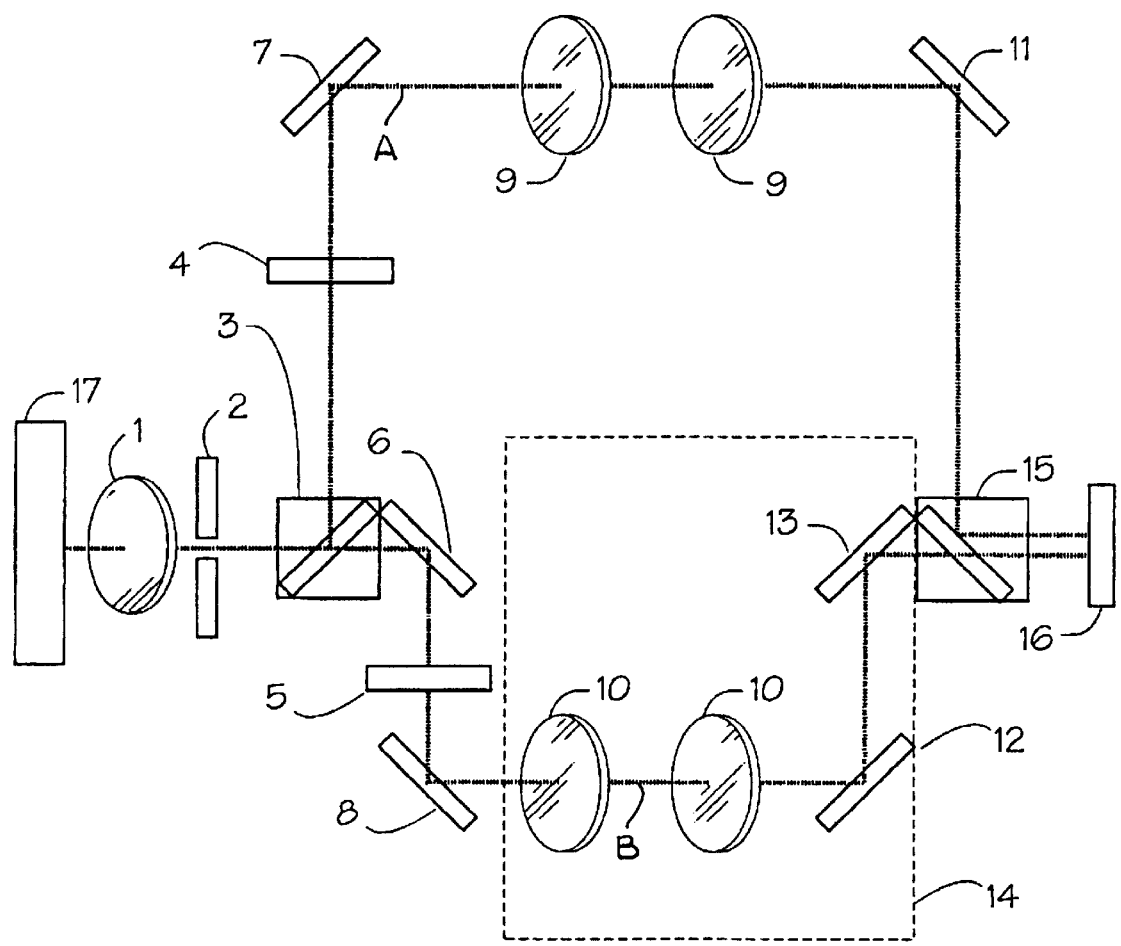
FIG. 1 is a schematic diagram of the optics portion of a preferred embodiment of the present invention, shown having two different path lengths, but in reality providing equal path lengths.
Figure 2:
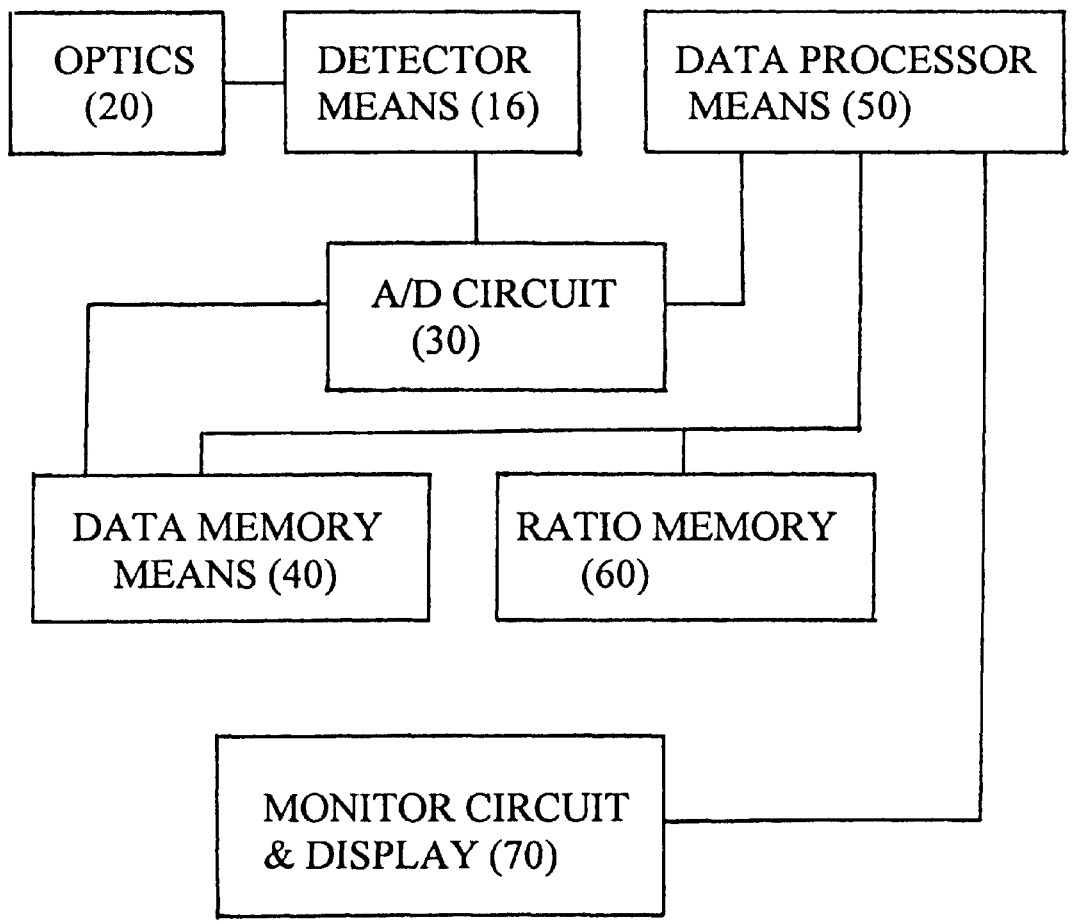
FIG. 2 is a block diagram of the apparatus of the preferred embodiment of the present invention.
Figure 3:
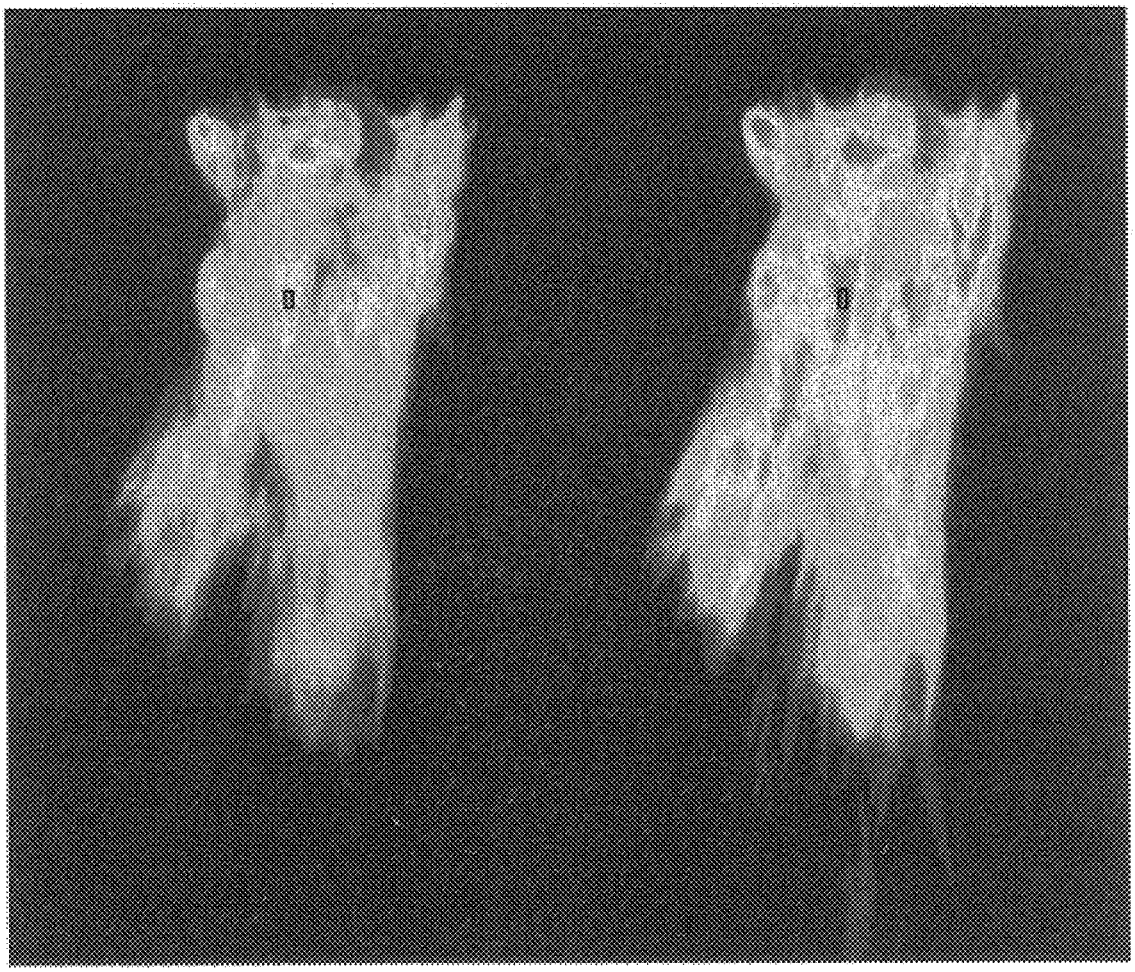
FIG. 3 is a color reproduction of the two side-by-side images captured by the present invention as they appear on a video monitor.
Figure 4:
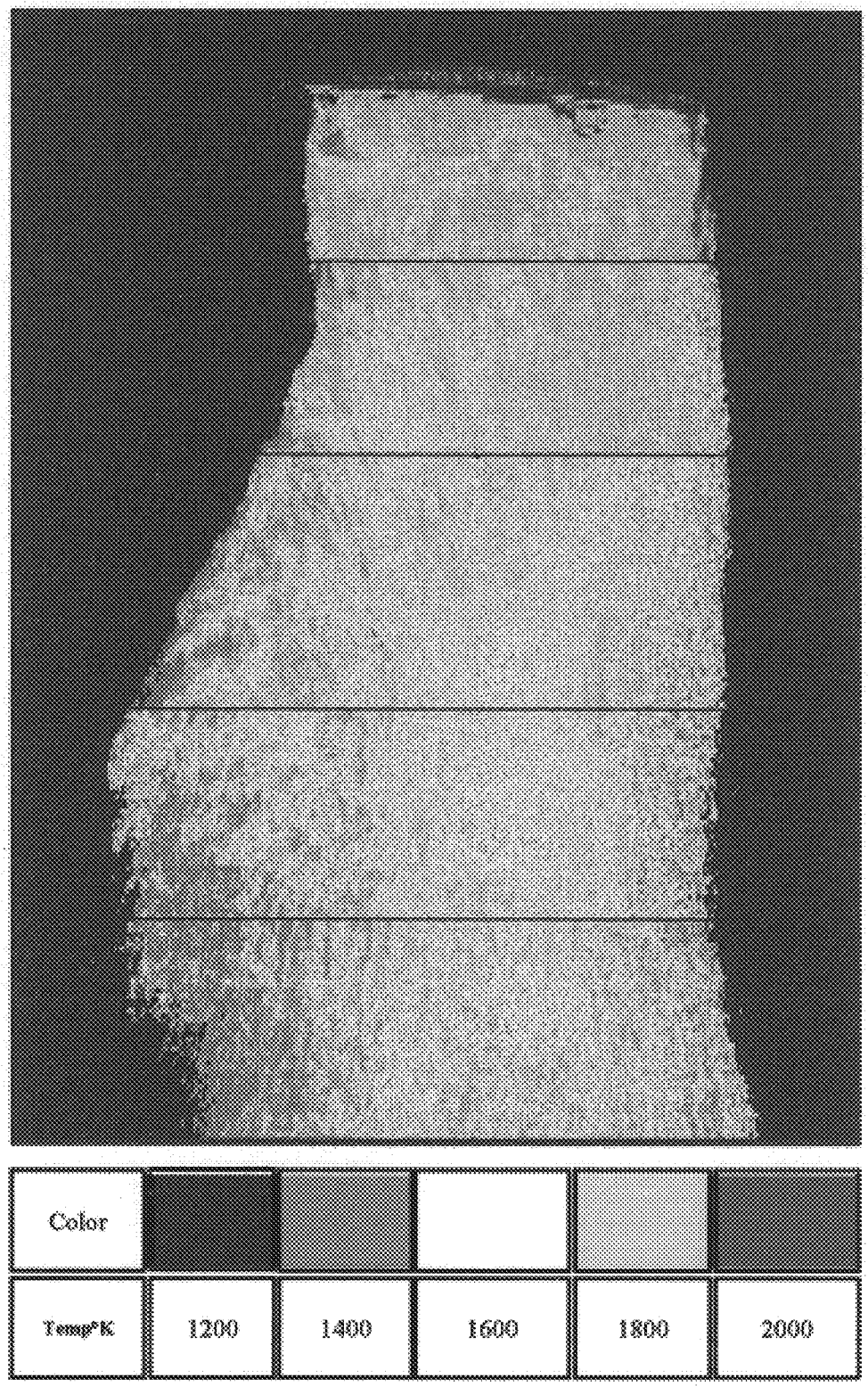
FIG. 4 is a color temperature image map representing a composite of the individual ratio numbers so as to describe temperature variations across the image in accordance with the color key shown in the figure.
Figure 1:
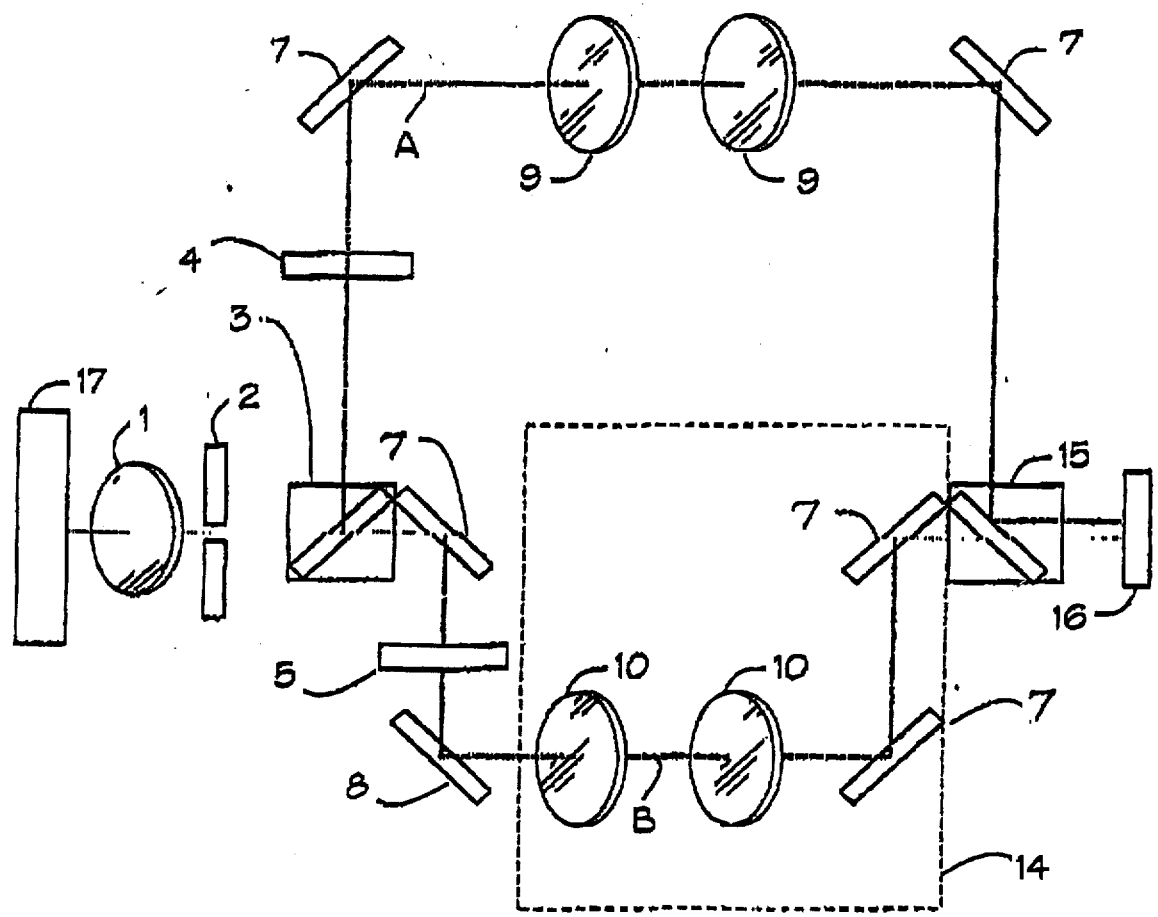

The above described drawing figures illustrate the instant invention. The invention is an imaging pyrometer device for use with a radiating object 17, the device comprising a dual path optical system 20 for processing light from the radiating object 17, the light being collected by a primary lens means 1, such as an optical lens characterized as forming an intermediate image in a plane of a field limiting means 2, such as a disk with a pinhole or an adjustable aperture, for establishing a field of view whereby light emitted from beyond the field of view is blocked from further ingress to the system. The light is then split by beam spitting means 3 into A and B complimentary beams. Beam A is directed by a beam spitting means 3 through a long wavelength filter means 4, such as a thin film interference filter with passband of 70 nm and centered at 950 nm, a long wavelength secondary lens means 9 such as a pair of acromatic lenses, and then is directed to a beam joining means 15 such as a standard beam splitter. Where necessary, beam directing is accomplished by mirrors 7 or similar means as shown in FIG. 1 Beam B is directed through a short wavelength filter means 5, a short wavelength secondary lens means 10 and thence is directed to the beam joining means 15. The components in both optical paths are identical except that the short wavelength optical filter 5 is preferably centered at 940 nm. The beam joining means 15 directs the beams A and B as non-overlapping and adjacent images normally incident to a digitizing detector means 16 such as a charge coupled device (CCD matrix) detector array having the CCD devices in a matrix such as 500 vertical, by 700 horizontal, discrete devices, thereby capturing a pair of images thereon.

An adjustment means 14, as shown in FIG. 1, operably adjusts the relative sizes, relative rotational orientation and relative position of the adjacent images on the detector means 16. Such adjustment means 14 includes the optical component holders, supports and positioning fixtures commonly available and well known in the art for positioning, adjusting, rotating, pivoting such optical components, and, in general, enabling the two optical paths to provide essentially identical optical transmission, reproduction and projection of the two images. Beam combiner 15, in coordination with mirrors 7, is able to assure that the two images are projected to the detector 16 so as to arrive normally to its surface and in side-by-side orientation the adjustment means may by placed in either of the legs A or B.

The CCD device provides a voltage output which is proportional to the level of light incident thereon. An A/D circuit 30, provides data corresponding to the CCD voltage levels to a data memory means 40, such as a magnetic domain storage disk, otherwise widely known as a hard drive. A data processor means 50, such as a microcomputer, computes the numbers as a ratio, for each pair of corresponding points on the two images and provides these ratio numbers for storage to a ratio memory (60) which is preferably a part of data memory means 40. These ratio numbers are used to construct a temperature map on a monitor means 70, preferably a standard computer monitor and display circuit, i.e., a standard CRT display.

A preferred method of use of the surface and particle imaging pyrometry device comprises the steps of:

a) providing a dual path optical system for processing light from a radiating object 17;

b) collecting the light at a primary lens means 1;

c) forming an intermediate image in a plane of a field limiting means 2 for establishing a field of view;

d) splitting the light into A and B complimentary beams;

e) directing beam A through a long wavelength filter means 4, a long wavelength secondary lens means 9 and then to a beam joining means 15;

f) directing beam B through a short wavelength filter means 5, a short wavelength secondary lens means 10 and then to the beam joining means 15;

g) adjusting the dual path optical system so that images transmitted by each are in side-by-side positions, projected in parallel, and correspondingly aligned;

h) detecting beams A and B as non-overlapping and adjacent images on a digitizing detector field to provide associated electrical signals corresponding to the images;

i) processing the signals so as to form ratios of the energy emitted from corresponding points on the radiating object; and j) constructing a map of the ratios as an image on a monitor means.

The method of use further preferably includes the step of adjusting the relative sizes, rotational orientation, and the relative positions of the adjacent images on the detector means to assure equal size and light density representation of the images of the A and B beams on the detector means 16.

The method of use further preferably includes the steps of viewing particles in a thermal spray, capturing bright particle images as streaks on the detector means, calculating particle velocity as a function of streak length, and calculating particle size as a function of steak width.

While the invention has been described with reference to at least one preferred embodiment, it is to be clearly understood by those skilled in the art that the invention is not limited thereto. Rather, the scope of the invention is to be interpreted only in conjunction with the appended claims.

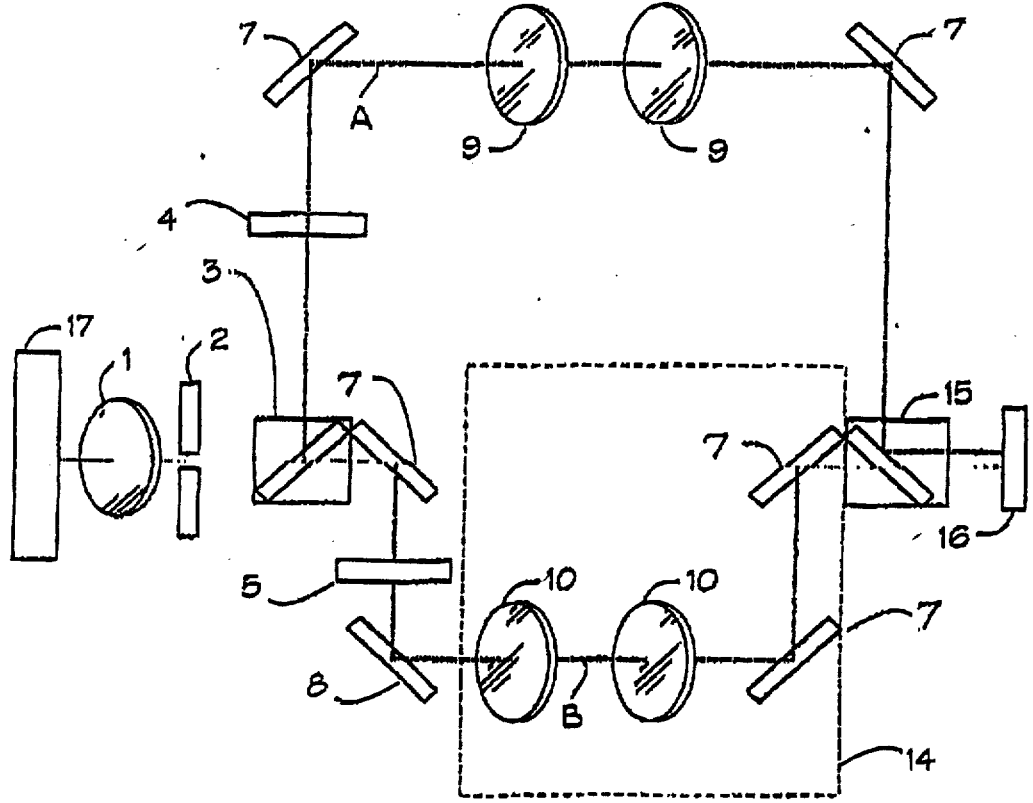

What is claimed is:

1. A surface and particle imaging pyrometer device for creating a temperature map of a radiating object, the device comprising:

a dual path optical system for processing light from the radiating object, the light being collected by a primary lens means forming an intermediate image in a plane of a field limiting means for establishing a field of view, the light thence being split into A and B complimentary beams by a beam splitter means;

beam A being directed through a long wavelength filter means, a long wavelength secondary lens means and thence is directed to a beam joining means;

beam B being directed through a short wavelength filter means, a short wavelength secondary lens means and an image adjustment means and thence is directed to the beam joining means;

the adjustment means for correcting size, positional and rotational differences between the images of beam A and beam B;

the beam joining means directing the beams A and B as non-overlapping and adjacent, equally sized normally incident images on a digitizing detector means thereby producing output signals for each of a plurality of points in each of the images;

a processor circuit forming a numerical ratio for each of a plurality of corresponding pairs of output signals, each said ratio corresponding to the temperature of each of the points of the radiating object;

a monitor means displaying the numerical ratios as a temperature map of the radiating object.

2. The apparatus of claim 1 wherein the digitizing detector means includes an intensified charge coupled device with a fast gating circuit.

3. A surface and particle imaging pyrometry method for use with a radiating object, the method comprising the steps of:

a) providing a dual path optical system for processing light from the radiating object;

b) collecting the light at a primary lens means;

c) forming an intermediate image in a plane of a field limiting means for establishing a field of view;

d) splitting the light into A and B complimentary beams;

e) directing beam A through a long wavelength filter means, a long wavelength secondary lens means and thence to a beam joining means;

f) directing beam B through a short wavelength filter means, a short wavelength secondary lens means and thence to the beam joining means;

g) directing beams A and B normally, as non-overlapping and adjacent images incident to a digitizing detector means thereby capturing images thereon;

h) adjusting the relative sizes, rotational orientation, and the relative positions of the adjacent images on the detector means to assure equal size and light density representations of the images of the A and B beams on the detector means;

i) producing output signals for each of a plurality of points in each of the images;

j) forming a numerical ratio for each of a plurality of corresponding pairs of output signals, each said ratio corresponding to the temperature of each of the points of the radiating object;

k) displaying the numerical ratios as a temperature map of the radiating object.

4. The method of claim 3 further including the steps of viewing particles in a thermal spray, capturing bright particle images as streaks on the detector means, calculating particle velocity as a function of streak length, and calculating particle size as a function of streak width.

5. The method of claim 4 further including the steps of providing the digitizing detector as intensified charge coupled device with a fast gating circuit and selecting a gating time to assure end point detection for at least one of the streaks.

* * * * *

UNITED STATES PATENT AND TRADEMARK OFFICE
CERTIFICATE OF CORRECTION

PATENT NO. : 5,963,311
DATED : October 5, 1999
INVENTOR(S) : Craig, et al

It is certified that error appears in the above-identified patent and that said Letters Patent is hereby corrected as shown below:

The title page, showing the illustrative figure, should be deleted to appear as per attached title page.

In the drawing:

The Drawing Sheet, consisting of Fig. 1, should be deleted to be replaced with the Drawing Sheet, consisting of Fig. 1, as shown on the attached page.

Signed and Sealed this

Twenty-sixth Day of September, 2000

Attest:

Q. TODD DICKINSON

*Attesting Officer*  *Director of Patents and Trademarks*

United States Patent [19]
Craig et al.

[11] Patent Number: 5,963,311
[45] Date of Patent: Oct. 5, 1999

[54] SURFACE AND PARTICLE IMAGING PYROMETER AND METHOD OF USE

[75] Inventors: James E. Craig, Lake Forest, Calif.; Ronald A. Parker, Genesseo, N.Y.; David Y. Lee, West Covina; Ernesto Hurtado, Laguna Niguel, both of Calif.

[73] Assignee: Stratonics, Inc., Laguna Hills, Calif.

[21] Appl. No.: 08/928,240

[22] Filed: Sep. 12, 1997

Related U.S. Application Data

[51] Int. Cl.$^6$ ................................ G01J 5/48; G01J 5/60
[52] U.S. Cl. ................................ 356/43; 356/45
[58] Field of Search ................................ 356/43–45

[56] References Cited

U.S. PATENT DOCUMENTS

| | | | |
|---|---|---|---|
| 4,411,519 | 10/1983 | Tagami | 356/45 |
| 4,413,324 | 11/1983 | Tatsuwaki et al. | 356/45 |
| 4,656,331 | 4/1987 | Lillquist et al. | 219/121.47 |
| 4,687,344 | 8/1987 | Lillquist | 374/124 |
| 5,180,921 | 1/1993 | Moreau et al. | 250/554 |
| 5,225,883 | 7/1993 | Carter et al. | 356/45 |
| 5,337,081 | 8/1994 | Kamiya et al. | 348/61 |

OTHER PUBLICATIONS

Gharib et al., Particle Tracing Revisited, 1989, pp. 110–126.

*Primary Examiner*—Robert H. Kim
*Assistant Examiner*—Amanda Merlino
*Attorney, Agent, or Firm*—Gene Scott-Patent Law & Venture Group

[57] ABSTRACT

An optical pyrometer and method of use provides a dual path optical system for processing light from a radiating stationary object or a moving thermal stream. Light is collected by primary optics forming an intermediate image in a plane of a field limiting aperture for establishing a preferred field of view. The light is then split into a pair of complimentary beams with one beam directed through a long wavelength filter and the other directed through a short wavelength filter. Both beams then move through separate secondary optics and are then rejoined and directed as normal non-overlapping and adjacent images onto a digitizing detector for capturing the images. Signals from the detector are handled by a computer where a ratio mapping of pair of signals from corresponding points on the two images is constructed and displayed on a monitor for viewing a temperature map of the object or thermal stream. The temperature of particles in the thermal stream is determined in a similar manner as well as particle velocity and size.

5 Claims, 4 Drawing Sheets